(12) United States Patent
Binder et al.

(10) Patent No.: US 11,614,051 B2
(45) Date of Patent: Mar. 28, 2023

(54) AIR INTAKE OF A TURBOJET ENGINE NACELLE COMPRISING GUIDE VANES

(71) Applicant: SAFRAN AIRCRAFT ENGINES, Paris (FR)

(72) Inventors: Anthony Binder, Moissy-Cramayel (FR); Daniel-Ciprian Mincu, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/600,539

(22) PCT Filed: Apr. 8, 2020

(86) PCT No.: PCT/EP2020/060040
§ 371 (c)(1),
(2) Date: Sep. 30, 2021

(87) PCT Pub. No.: WO2020/212228
PCT Pub. Date: Oct. 22, 2020

(65) Prior Publication Data
US 2022/0170430 A1     Jun. 2, 2022

(30) Foreign Application Priority Data

Apr. 17, 2019 (FR) ...................................... 1904094

(51) Int. Cl.
| | | |
|---|---|---|
| *F02K 1/66* | (2006.01) | |
| *B64D 33/02* | (2006.01) | |
| *F02C 7/042* | (2006.01) | |

(52) U.S. Cl.
CPC ................ *F02K 1/66* (2013.01); *B64D 33/02* (2013.01); *F02C 7/042* (2013.01)

(58) Field of Classification Search
CPC ............ F02C 7/042; F02K 1/66; B64D 33/02
See application file for complete search history.

(56) References Cited

U.S. PATENT DOCUMENTS 3,623,328 A * 11/1971 Pike ........................ F02C 7/045
60/216
3,662,556 A * 5/1972 Poucher ..................... F02K 1/72
137/15.1

(Continued)

FOREIGN PATENT DOCUMENTS

| EP | 0516468 A2 | 12/1992 |
|---|---|---|
| GB | 1252193 A | 11/1971 |
| GB | 1565212 A | 4/1980 |

OTHER PUBLICATIONS

Search Report from the French Intellectual Property Office on corresponding FR application (FR1904094) dated Dec. 5, 2019.

(Continued)

*Primary Examiner* — Lorne E Meade
(74) *Attorney, Agent, or Firm* — KOS IP Law LLP (57) ABSTRACT

Disclosed is a method for using an aircraft turbojet engine comprising an air inlet comprising a plurality of rectifier vanes, each rectifier vane being mounted such that it can move between a retracted position to assist the thrust phase and a deployed position in which the rectifier vane protrudes from the inner wall in a radially inward direction in order to rectify the reverse air flow of the inner wall to assist a thrust-reverse phase, in which method at least one rectifier vane is in the retracted position during a turbojet engine thrust phase, the method comprising, during a thrust-reverse phase of the turbojet engine, a step of moving the rectifier vane to the deployed position.

8 Claims, 9 Drawing Sheets

(56) References Cited

U.S. PATENT DOCUMENTS

| | | | | |
|---|---|---|---|---|
| 3,729,934 | A * | 5/1973 | Denning | F02K 1/66 |
| | | | | 415/130 |
| 3,736,750 | A | 6/1973 | Britt | |
| 4,254,619 | A * | 3/1981 | Giffin, III | F04D 29/362 |
| | | | | 60/226.3 |
| 5,156,362 | A * | 10/1992 | Leon | B64D 33/02 |
| | | | | 244/130 |
| 10,378,554 | B2 * | 8/2019 | Yu | F04D 29/584 |
| 10,815,886 | B2 * | 10/2020 | Kroger | F04D 29/541 |
| 2018/0100434 | A1 | 4/2018 | Dindar et al. | |

OTHER PUBLICATIONS

International Search Report and Written Opinion on corresponding PCT application (PCT/EP2020/060040) from International Searching Authority (EPO) dated Jun. 4, 2020.

\* cited by examiner

PRIOR ART

FIGURE 1

PRIOR ART

FIGURE 11B

AIR INTAKE OF A TURBOJET ENGINE NACELLE COMPRISING GUIDE VANES

TECHNICAL FIELD

The present invention relates to the field of aircraft turbojet engines and is more particularly directed to an air intake of an aircraft turbojet engine nacelle.

In a known manner, an aircraft comprises one or more turbojet engines to enable its propulsion by acceleration of an air flow that circulates from upstream to downstream in the turbojet engine.

Figure 1:
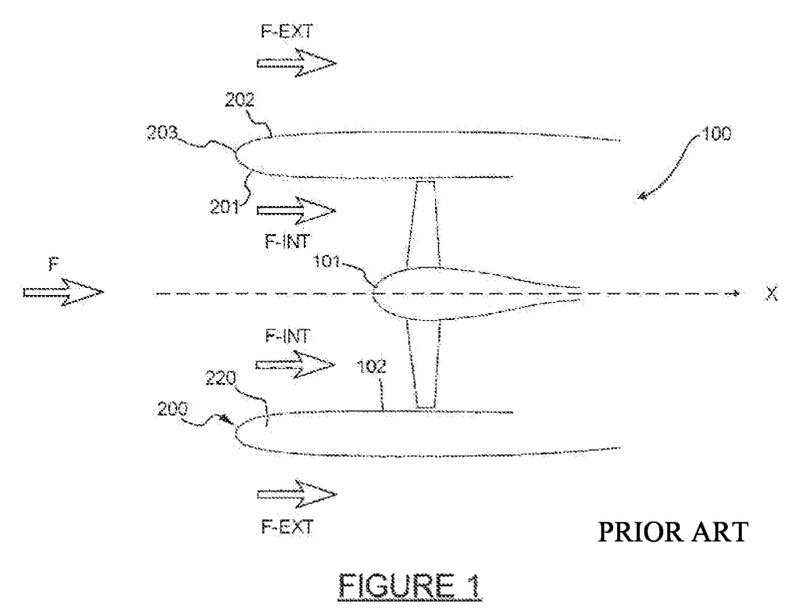
FIG. 1 is a schematic representation in a longitudinal cross-section view of a turbojet engine nacelle operating in thrust, according to prior art.

With reference to FIG. 1, a turbojet engine 100 is represented, extending along an axis X and comprising a fan 101 rotatably mounted about axis X in an external shell 102 in order to accelerate, during the thrust of the turbojet engine 100, an air flow circulating from upstream to downstream in the turbojet engine 100, referred to as the internal air flow F-INT. Hereinafter, the terms "upstream" and "downstream" are defined with respect to the circulation of the internal air flow F-INT.

In a known manner, the turbojet engine 100 comprises a nacelle comprising at its upstream end an air intake 200 comprising an internal wall 201 pointing to axis X and an external wall 202 opposite to the internal wall 201. The walls 201, 202 are connected by an air intake lip 203, which comprises a leading edge, so as to form an annular cavity 220. The air intake 200 has an aerodynamic profile for separating an upstream air flow F into the internal air flow F-INT guided by the internal wall 201 and an external air flow F-EXT guided by the external wall 202. Hereinafter, the terms "internal" and "external" are defined radially with respect to axis X of the turbojet engine 100.

In order to reduce braking distance of an aircraft, especially during landing, it is known to integrate in a nacelle a thrust reversal system for modifying the orientation of the air flow at the exhaust so as to perform a thrust reversal phase. In a known way, a reverse thrust phase is achieved is made by opening flaps and/or grilles in the secondary stream, downstream of the straighteners, in order to lead the air flows radially outwardly or upstream.

For a high bypass ratio turbojet engine, the nacelle has a large diameter and it is not desired to integrate a conventional thrust reversal system since this would be significantly detrimental to the weight, overall size and drag of the turbojet engine.

To allow a thrust reversal phase, another solution consists in providing a Variable Pitch Fan, or VPF, so as to make it possible to reverse the air flow circulating in the secondary stream of a turbojet engine and thus create a reverse thrust allowing the aircraft to decelerate during landing.

Figure 2:
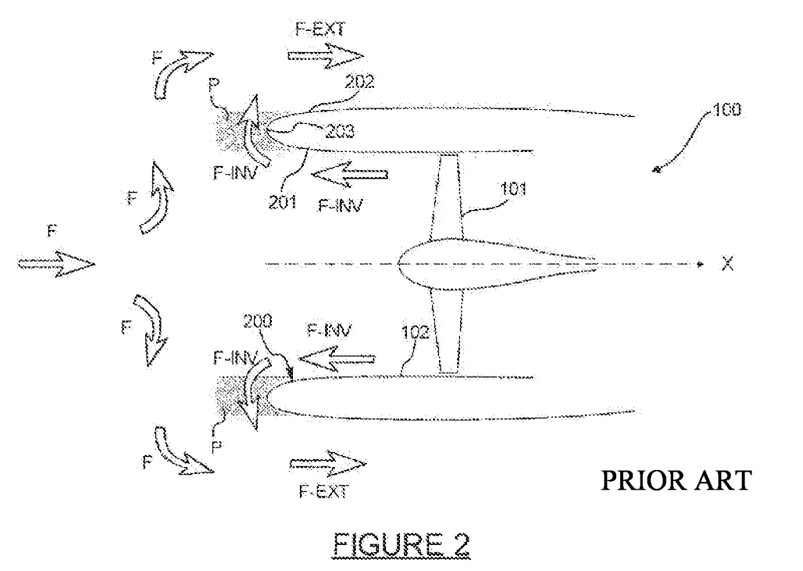
FIG. 2 is a schematic representation in a longitudinal cross-section view of a turbojet engine nacelle operating in reverse thrust, according to prior art.

With reference to FIG. 2, during a thrust reversal phase, a reverse air flow F-INV circulates from downstream to upstream in the turbojet engine 100, that is, reversely to the internal air flow F-INT of FIG. 1. More precisely, the reverse air flow F-INV circulates between the head of the fan vanes 101 and the external shell 102. The reverse air flow F-INV is guided upstream by the internal wall 201. This reverse air flow F-INV then opposes the upstream air flow F, thereby allowing the thrust reversal phase.

In practice, as illustrated in FIG. 2, during a thrust reversal phase, the reverse air flow F-INV is twisted under the action of the rotation of the fan 101 in an azimuthal manner. As a result, the reverse air flow F-INV does not circulate in the same direction as the upstream air flow F, which reduces the performance of the reverse thrust phase. Furthermore, part of the reverse air flow F-INV bypasses the aerodynamic profile of the air intake 200 along a substantially radial direction, which leads to the occurrence of a zone of local depression P in the vicinity of the air intake lip 203. Such a local depression P generates an upstream suction, that is, a force that opposes the reverse thrust. In practice, this phenomenon reduces the reverse thrust very significantly.

The invention thus aims at reducing this phenomenon in order to increase the performance of the turbojet engine during the reverse thrust phase without affecting the performance of said aircraft during thrust.

In prior art from U.S. Pat. No. 3,736,750A1, an air intake comprising ring portions movable between a cruise, takeoff and landing position in order to reduce the noise emitted is known. Such ring portions do not promote the thrust reversal phase, especially for a high bypass ratio jet engine, for which a flap thrust reversal system is heavy and of large overall size.

SUMMARY

The invention relates to an air intake of an aircraft turbojet engine nacelle extending along an axis X oriented from upstream to downstream in which an internal air flow circulates from upstream to downstream during a thrust phase and a reverse air flow from downstream to upstream during a thrust reversal phase, the air intake extending circumferentially about axis X and comprising an internal wall pointing to axis X and configured to guide the internal air flow and the reverse air flow, and an external wall, opposite to the internal wall, and configured to guide an external air flow, the internal wall and the external wall being connected together by an air intake lip.

The invention is remarkable in that the air intake comprises a plurality of guide vanes, each guide vane being movably mounted between:
  a retracted position to promote the thrust phase and
  an extended position in which the guide vane projectingly extends from the internal wall along a radially inward direction in order to guide the reverse air flow from the internal wall to promote the reverse thrust phase.

By virtue of the invention, guide vanes are extended in order to guide the reverse air flow circulating in the vicinity of the internal wall. The gyration of part of the reverse air flow is thus reduced or even eliminated so as to directly oppose the axial air flow in order to obtain an optimal thrust reversal phase. Thus, in the manner of OGV type vanes placed downstream of the fan and used during thrust, the air intake guide vanes, upstream of the fan, allow for optimal guiding during the thrust reversal phase to guide the reverse air flow from the fan.

Further, as the guided air flow is axially oriented, this allows separation at the air intake lip to be promoted and thus improves thrust compared to prior art by eliminating the formation of a vacuum.

The term "guide vane" refers to an aerodynamic profile as well as any other profile, such as a plate of constant thickness, straight or tilted.

According to one aspect of the invention, the guide vanes are distributed over the circumference of the air intake about axis X, in a uniform or non-uniform manner so as to adapt the guiding as a function of the circumferential environment of the air intake and, more generally, of the nacelle. Thus, the reverse air flow can advantageously be oriented according to the needs and restrictions.

According to one aspect of the invention, the air intake comprises at least one moving member configured to move the guide vane from the retracted position to the extended position.

According to one aspect, the moving member is active. The moving member is in the form of a controllable actuator.

According to another aspect, the moving member is passive and is preferably in the form of a pneumatic conduit formed in the annular cavity and opening onto the guide vane in order to move it by suction or blowing between the retracted position and the extended position.

According to another aspect, the guide vane is translationally and/or rotationally mounted in the air intake. A guide vane is configured to be rotatably driven about an axis of rotation substantially parallel to axis X (lateral rotation) or an axis of rotation substantially orthogonal to axis X (longitudinal rotation).

According to one aspect of the invention, the guide vane comprises an aerodynamic profile. The guide vane comprises, in a radial cross-sectional plane, a leading edge positioned downstream and a trailing edge positioned upstream. Thus, the guide vane is adapted to guide only the air flow during the thrust reversal phase. Preferably, the guide vane comprises a front side, in particular curved, surface, and a back side, in particular curved, surface.

According to one aspect of the invention, the air intake comprises a cover member movably mounted between an operating position, in which said cover member covers the guide vane in a retracted position so as to ensure an aerodynamic profile during thrust, and a storage position, in which said cover member is offset from its operating position so that the guide vane is in the extended position. Such a cover member allows the aerodynamic profile of the air intake to be optimized in the retracted position.

According to one aspect, the guide vane extends into the annular cavity of the air intake in the retracted position. According to one aspect, the guide vane extends into an azimuthal cavity.

The invention also relates to an aircraft turbojet engine extending along an axis X oriented from upstream to downstream in which an internal air flow circulates from upstream to downstream during a thrust phase and a reverse air flow from downstream to upstream during a thrust reversal phase, said turbojet engine comprising a fan configured to perform a thrust reversal and a nacelle comprising an air intake, as previously set forth, so as to promote said thrust reversal, the guide vanes being positioned upstream of the fan.

According to one preferred aspect of the invention, the turbojet engine comprising fan vanes, the length of a guide vane is less than ⅓ of the length of a fan vane.

The invention also relates to a method for operating an air intake, as set forth above, in which at least one guide vane is in the retracted position during a thrust phase of the turbojet engine, the method comprising, during a thrust reversal phase of said turbojet engine, a step of moving the guide vane into the extended position so that the guide vane projectingly extends from the internal wall in a radially internal direction in order to guide the reverse air flow of the internal wall to promote the thrust reversal phase.

BRIEF DESCRIPTION OF THE DRAWINGS

The invention will be better understood from the following description, which is given solely by way of example, and refers to the appended drawings given as non-limiting examples, in which identical references are given to similar objects and in which:

FIG. 7A and

FIG. 9A,

FIG. 9B,

FIG. 9C and

FIG. 10A,

FIG. 10B,

FIG. 10C and

FIG. 11A and

It should be noted that the figures set out the invention in detail to implement the invention, said figures may of course serve to further define the invention where appropriate.

DETAILED DESCRIPTION

Figure 3:
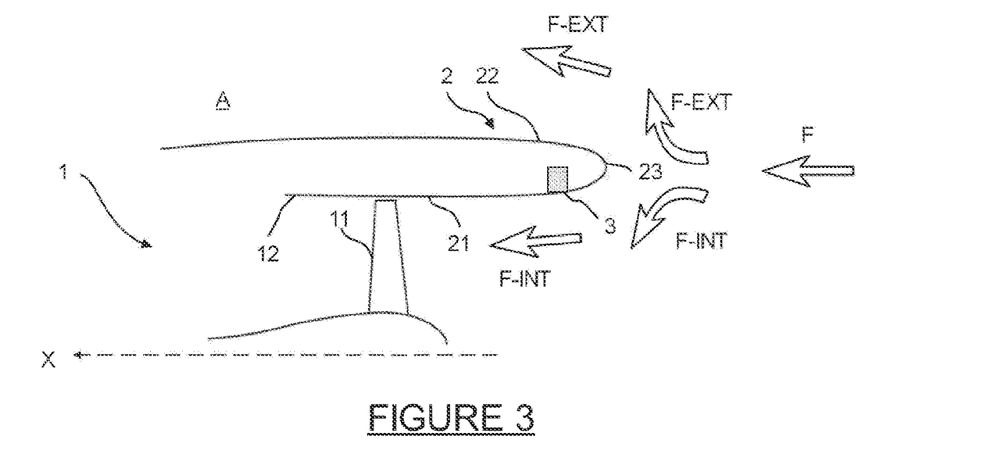
FIG. 3 is a schematic representation in a longitudinal cross-section view of a turbojet engine nacelle operating in thrust, according to the invention.
Figure 4:
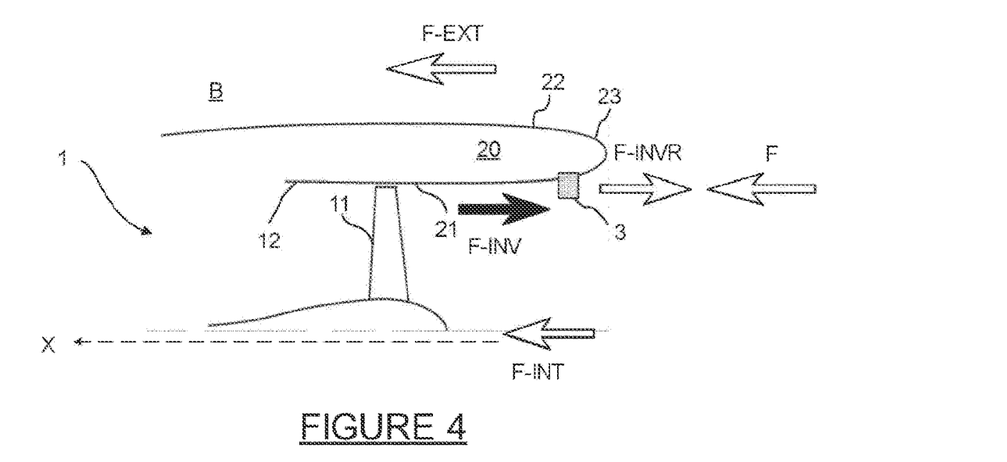
FIG. 4 is a schematic representation in a longitudinal cross-section view of a turbojet engine nacelle operating in reverse thrust, according to the invention.

With reference to FIGS. 3 and 4, a turbojet engine 1 according to the invention extending along an axis X oriented from upstream to downstream and comprising a fan 11 rotatably mounted about axis X in an external shell 12 defining an air stream is represented. In a known manner, the fan 11 is configured, during a thrust phase, to accelerate an air flow circulating from upstream to downstream in the turbojet engine 1, known as the internal air flow F-INT (FIG. 3), and during a thrust reversal phase, to accelerate an air flow circulating from downstream to upstream in the turbojet engine 1, known as the reverse air flow F-INV (FIG. 4). In practice, the reverse air flow F-INV circulates from downstream to upstream in a radially external portion of the air stream, in particular, over ⅓ of the air stream radius. An internal air flow F-INT always circulates from upstream to downstream in a radially internal portion of the air stream, in particular, over ⅔ of the air stream radius. The internal air flow F-INT ensures a sufficient flow rate to avoid any pumping phenomenon of the turbojet engine.

As illustrated in FIG. 3, the turbojet engine 1 comprises a nacelle which comprises at its upstream end an air intake 2 extending circumferentially about axis X and comprising an internal wall 21, pointing to axis X and configured to guide the internal air flow F-INT and the reverse air flow F-INV, and an external wall 22, opposite to the internal wall 21 and configured to guide an external air flow F-EXT. The walls 21, 22 are connected by an air intake lip 23, comprising a leading edge, forming an annular cavity 20.

In this example, the turbojet engine 1 comprises thrust reversing means, in particular, a variable pitch fan 11, or VPF, for reversing the air flow circulating in the turbojet engine 1 and thus creating a reverse thrust allowing deceleration of the aircraft during landing.

According to the invention, with reference to FIGS. 3 and 4, the air intake 2 comprises a plurality of guide vanes 3, each guide vane 3 being movably mounted between:
- a retracted position A to promote the thrust phase and
- an extended position B in which the guide vane 3 projectingly extends from the internal wall 21 along a radially internal direction in order to guide the reverse air flow F-INV from the internal wall 21 to promote the reverse thrust phase.

Thus, the air intake 2 allows for two different roles during thrust and during reverse thrust. In the retracted position A, the guide vane 3 does not affect the aerodynamic performance of the leading edge 23 which has an aerodynamic profile. The thrust is thus optimal.

Following its movement in the extended position B, each guide vane 3 allows for guiding the F-INV air flow which has been previously twisted by the fan 11 during a thrust reversal phase. A guided reverse air flow F-INVR thus circulates on the internal wall 21 of the air intake 21 which optimally opposes to the upstream air flow F. The performance of the reverse thrust phase is optimal.

According to the invention, for the thrust reversal phase, the guide vanes 3 perform a function analogous to the vanes located in the secondary stream and known to those skilled in the art under the abbreviation "Outlet Guide Vane".

Figure 5:
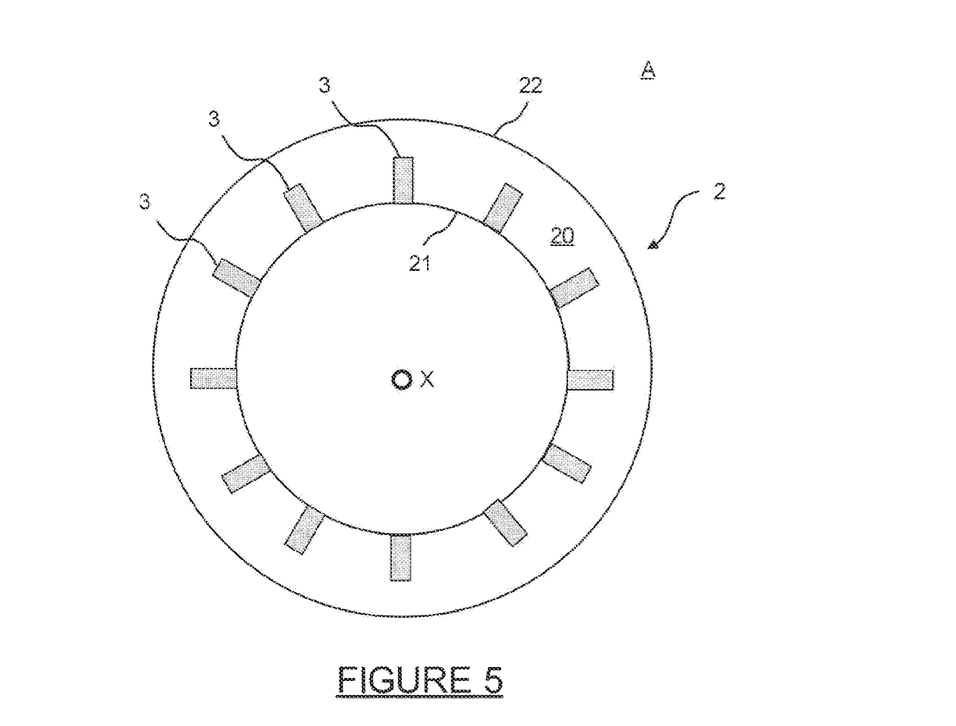
FIG. 5 is a schematic representation in a transverse cross-section view of an air intake comprising a row of guide vanes on the air intake lip in the retracted position.
Figure 6:
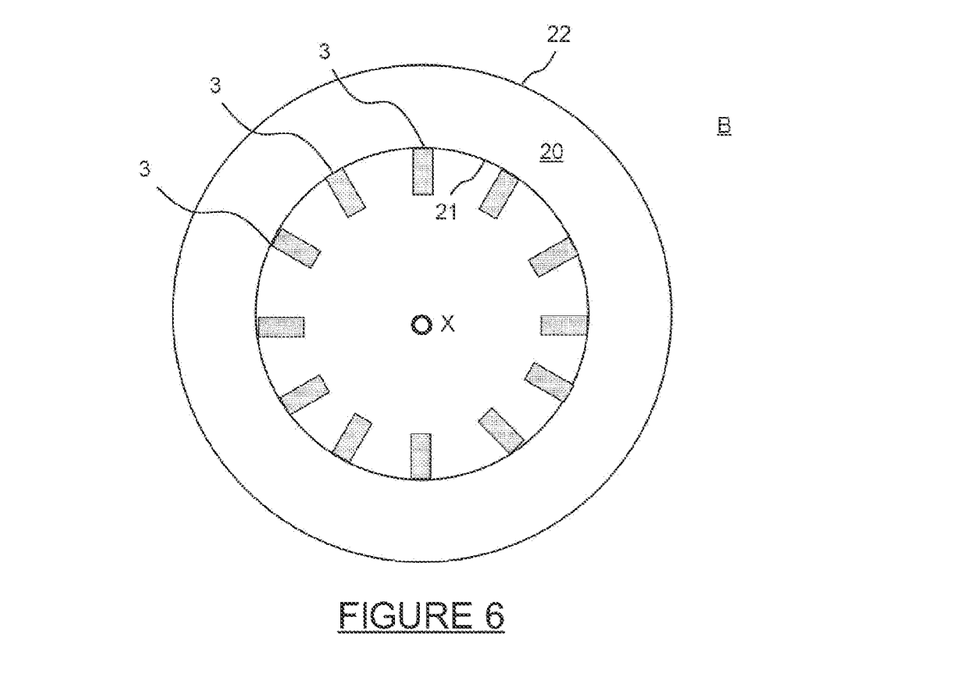
FIG. 6 is a schematic representation in a transverse cross-section view of an air intake comprising a row of guide vanes on the air intake lip in the extended position.

With reference to FIG. 5, an air intake 2 is represented, comprising several guide vanes 3 which are distributed at the circumference of the air intake 2 about axis X in such a way as to enable the thrust reversal phase to be improved. Preferably, the number of guide vanes 3 is large enough to allow guiding over the entire circumference of the air intake 2 and small enough to reduce weight and drag. Preferably, when the turbojet engine 1 comprises OGV type vanes, the number of guide vanes 3 for the thrust reversal phase is substantially equal to the number of OGV type vanes.

Preferably, in order to modify guiding of the reverse air flow differently at the circumference of the air intake, the guide vanes 3 may not be identical or may be moved to different extension degrees. This advantageously allows the circumferential environment of the air intake to be taken into account, in particular to limit acoustic nuisance by directing the reverse air flow.

Preferably, the guide vanes 3 are organized in rows, each row comprising a plurality of guide vanes 3 positioned at the same radial distance from axis X. Alternatively, the guide vanes 3 may be positioned at different radial distances to vary the guiding of the reverse air flow differently at the circumference of the air intake. As an example, a single row is represented in FIG. 5, but obviously the number of rows could be higher.

The axial position of the guide vanes 3, that is the distance from the fan 11, can vary depending on the application. Indeed, the closer the guide vanes 3 are to the fan 11, the more effective the guiding. Conversely, the further the guide vanes 3 are from the fan 11, the lower the noise generated.

Figure 7A:
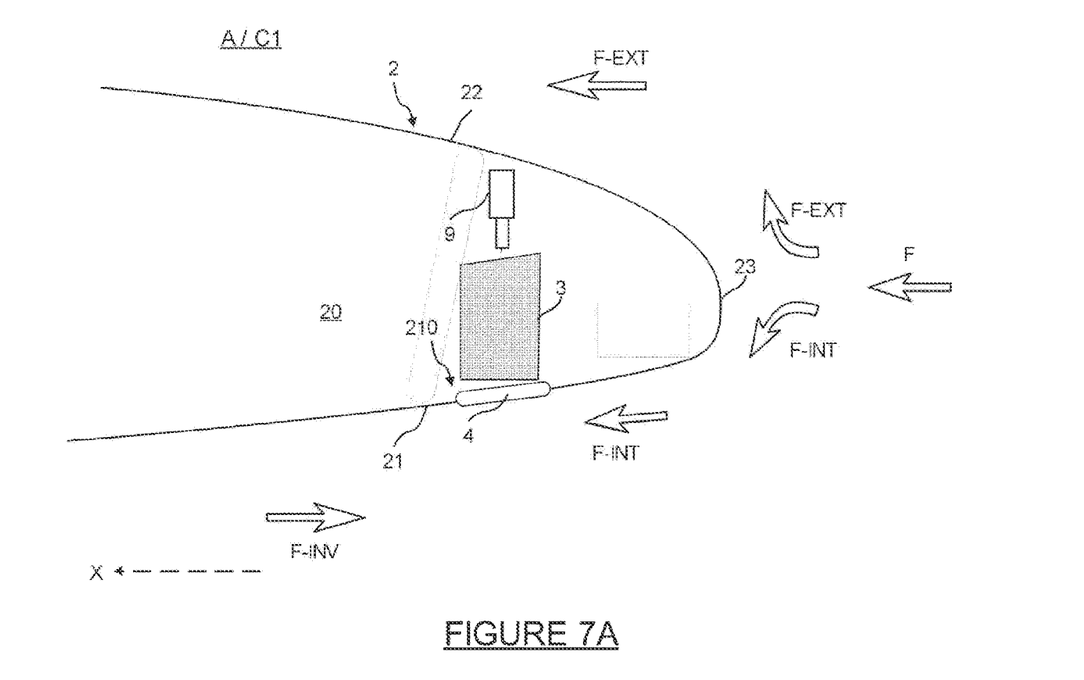
Figure 7B:
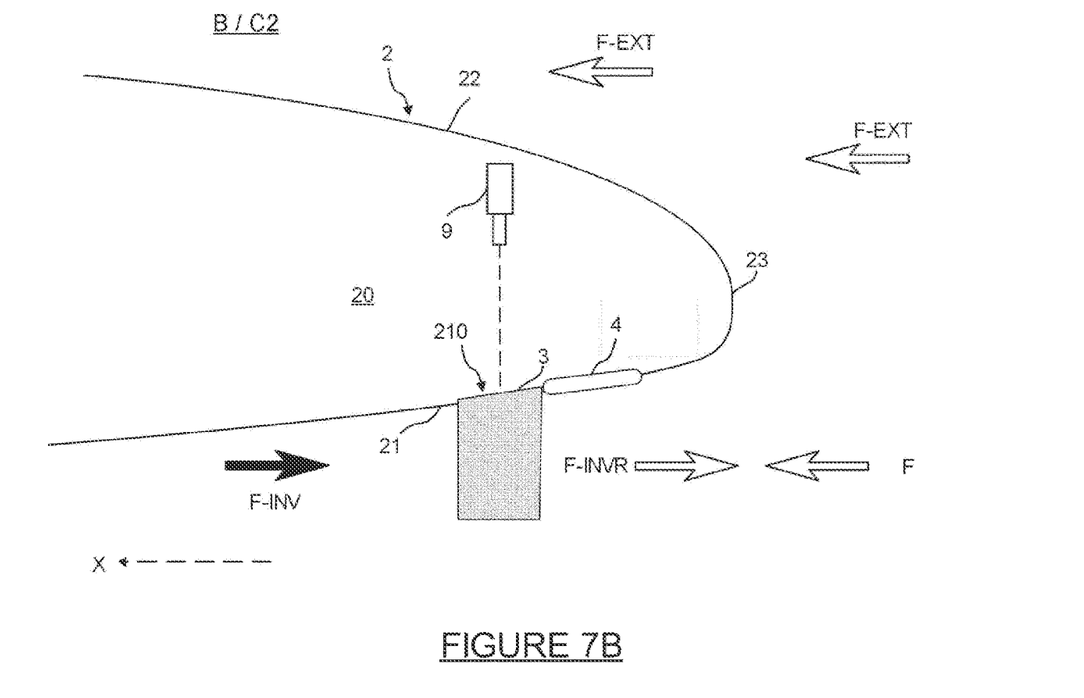
FIG. 7B are schematic representations in a longitudinal cross-section view of an air intake comprising a guide vane on the air intake lip in a first retracted position and a second extended position.

With reference to FIGS. 7A and 7B, an air intake 2 is represented, comprising a guide vane 3 movably mounted along a radial extension direction. However, it goes without saying that the extension direction could comprise a longitudinal or azimuthal component, the important thing being that the extension direction comprises at least a radial component. A predominantly radial extension direction is nevertheless preferred since it allows the guide vanes 3 to perform a function similar to the radially extending OGV vanes. The internal wall 21 comprises a passage opening 210 leading into the annular cavity 20 in which the guide vane 3 moves in the extended position B. The dimensions of the passage opening 210 are determined so as to minimize the clearance with the guide vane 3 in the extended position B. This limits circulation of the reverse air flow F-INV in the annular cavity 20 in the extended position B.

In this example, the air intake 2 comprises a moving member 9 to translationally move the guide vane 3 from the retracted position A to the extended position B. By way of example, this moving member 9 is in the form of a moving member 9 which is active, for example, in the form of a pneumatic, hydraulic, electric or other actuator in order to allow a movement as a result of receiving a control command from a calculator. Preferably, the moving member 9 also allows the guide vane 3 to be translationally moved from the extended position B to the retracted position A. The air intake 2 may comprise one or more controllable moving members 9.

Figure 8:
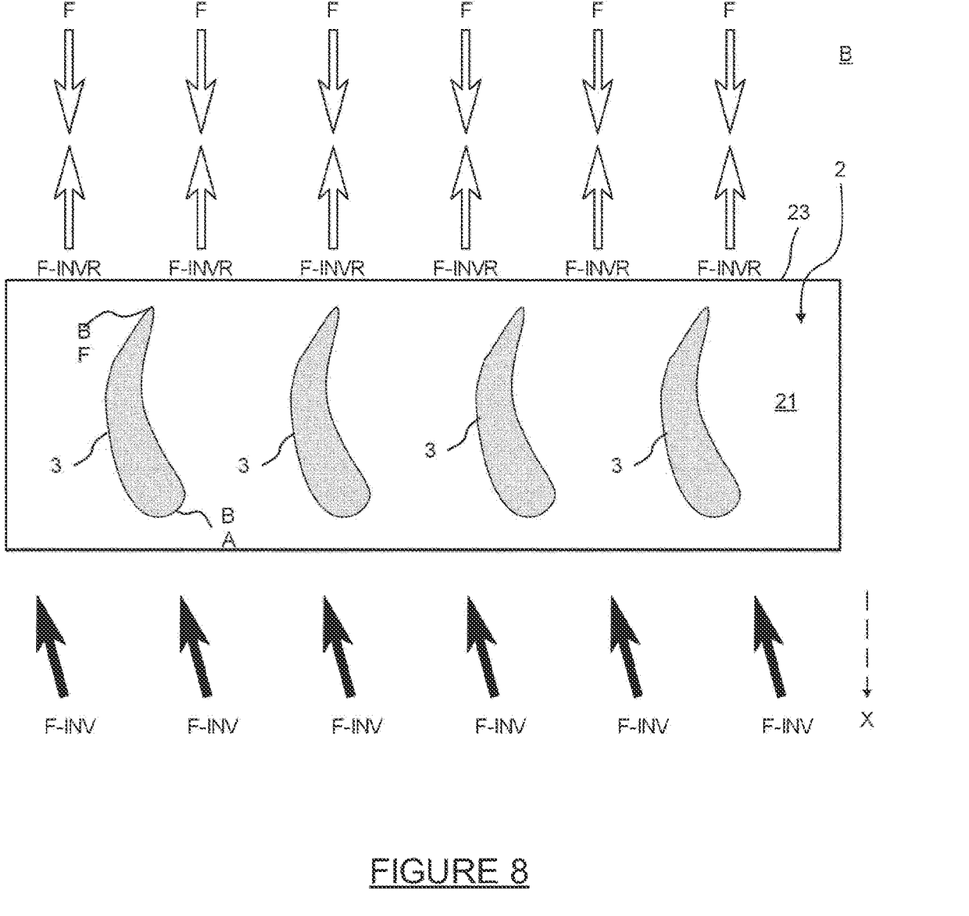
FIG. 8 is a partial schematic representation of the air intake in a plane of revolution when the guide vanes are in the extended position.

As illustrated in FIG. 8, the guide vane 3 comprises, in a radial cross-sectional plane, a leading edge BA positioned downstream and a trailing edge BF positioned upstream. Preferably, the guide vane has an aerodynamic profile so as to guide the reverse air flow F-INV on the front side and the back side of the guide vane 3 and to obtain a guided reverse air flow F-INVR that circulates axially.

Still referring to FIGS. 7A and 7B, the controllable moving member 9 allows the movable connection member 3 to be moved radially inwardly so that the guide vane 3 projectingly extends into the circulation of the reverse air flow F-INV that is twisted by the fan 11.

According to an optional aspect of the invention, with reference to FIGS. 7A and 7B, the air intake 2 comprises a cover member 4 movably mounted between an operating position C1, in which said cover member 4 covers the guide vane 3 in the retracted position A so as to ensure an aerodynamic profile during thrust (FIG. 7A), and a storage position C2, in which said cover member 4 is offset from its operating position C1 so that the guide vane 3 is in an extended position B (FIG. 7B). In the retracted position A, the cover member 4 covers the guide opening 210 and does not cover it in the extended position B.

Preferably, the cover member 4 is made of a material identical to the internal wall 21 and its shape is chosen to be an extension of the internal wall 21 so that the aerodynamic profile of the air lip 2 remains unchanged during thrust.

In the example of FIGS. 7A-7B, the cover member 4 is translationally moved along the internal wall 21 upstream, from the operating position C1 to the storage position C2. However, it goes without saying that the cover member 4 could have other shapes and be moved in a different manner, in particular, along a circumferential direction. Furthermore, the cover member 4 may comprise one or more parts.

Furthermore, the movement of the cover member 4 may be performed by the moving member 9 of the guide vane 3 or by any other moving member.

In the extended position B, as illustrated in FIG. 7B and FIG. 8, the guide vanes 3 act on the reverse air flow F-INV in order to align it axially with the upstream air flow F and allow an optimal thrust reversal phase. The action of the fan 11 can thus participate effectively in the thrust reversal phase.

Figure 7C:
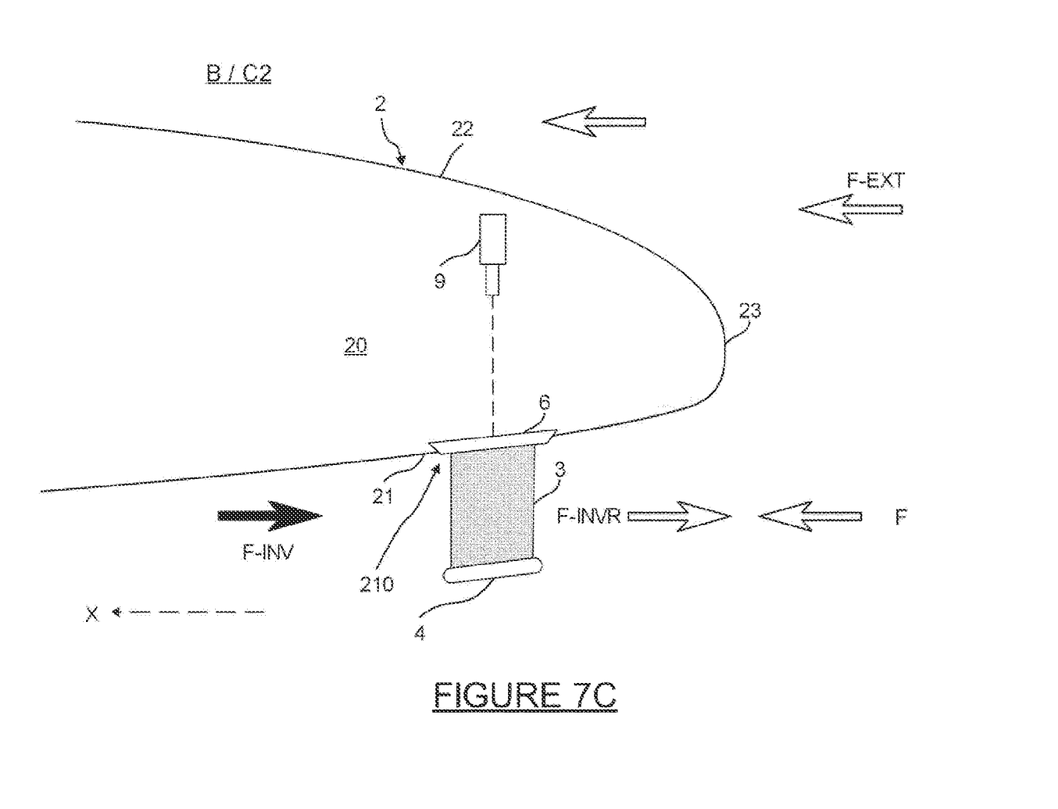
FIG. 7C is a schematic representation in a longitudinal cross-section view of an air intake comprising a guide vane to which a cover member is secured.

Alternatively, with reference to FIG. 7C, the cover member 4 is mounted integral with the internal end of the guide vane 3 and is moved with the latter in the reverse air flow F-INV. Such an embodiment requires only the guide vane 3 to be moved, which is advantageous.

Still referring to FIG. 7C, the guide vane 3 comprises, at its external end, a closure member 6 configured to at least partially fill the passage opening 210 of the internal wall 21 in which the guide vane 3 moves in the extended position B. Such a closure member 6 advantageously makes it possible to limit circulation of the reverse air flow F-INV in the annular cavity 20 of the air intake 2, in particular, via the clearance formed between the guide vane 3 and the guide opening 210. Of course, such a closure member 6 is also adaptable to other embodiments. The closure member 6 is preferably integral with the guide vane 3.

In FIGS. 7A-7C, a guide vane 3 that is extended in a substantially radial direction has been represented. Nevertheless, the extension of the guide vanes 3 could be performed according to different kinematics.

Figure 9A:
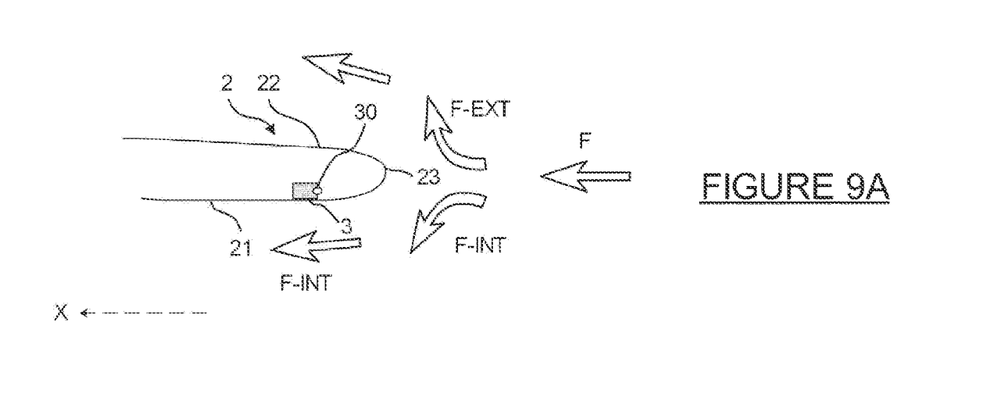
Figure 9B:
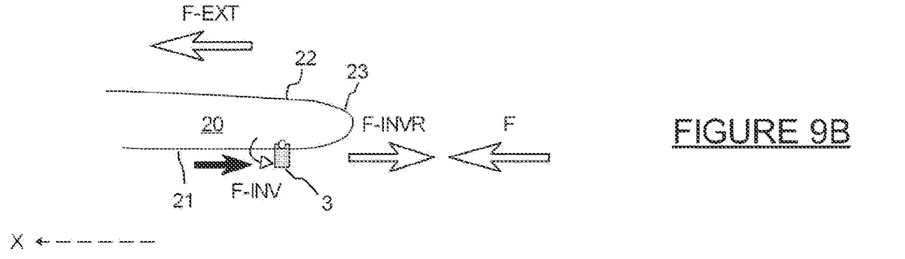

With reference to FIGS. 9A-9B, a first rotational kinematics is represented in which the guide vane 3 is pivoted about an azimuthal hinge axis 30 upstream. In the retracted position A (FIG. 9A), the guide vane 3 is aligned longitudinally downstream and then swung upstream to extend substantially radially in the extended position B (FIG. 9B). In the extended position B, the guide vane 3 does not necessarily extend radially but may be tilted downstream or upstream.

Figure 9C:
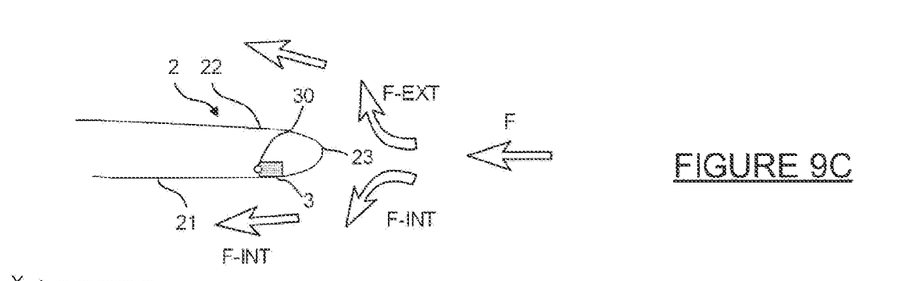
Figure 9D:
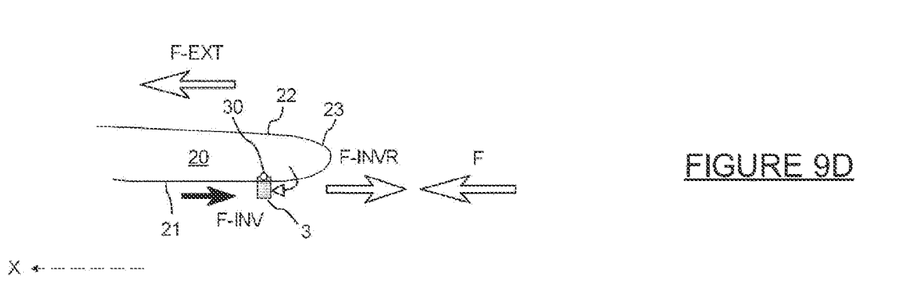
FIG. 9D are schematic representations of the extension kinematics of a rotating guide vane.

Similarly, with reference to FIGS. 9C-9D, a second rotational kinematics is represented in which the guide vane 3 is pivoted about an azimuthal hinge axis 30 downstream. In the retracted position A (FIG. 9C), the guide vane 3 is aligned longitudinally upstream and then swung downstream to extend substantially radially in the extended position B (FIG. 9D). In the extended position B, the guide vane 3 does not necessarily extend radially but may be tilted downstream or upstream.

A guide vane rotatably driven about an axis of rotation substantially orthogonal to axis X (longitudinal rotation) has been set forth, but it goes without saying that the axis of rotation could be substantially parallel to axis X (lateral rotation). According to this alternative, the guide vane 3 is preferably placed in an azimuthal cavity in the retracted position A, in particular, pressed against the internal wall 21.

Rotational kinematics is advantageous because it limits radial overall size in the retracted position A. It goes without saying that the guide vane 3 could also be moved according to a kinematics combining rotation and translation.

According to one preferred aspect of the invention, the guide vane 3 forms a portion of the internal wall 21 that is pivoted in the extended position. In other words, the guide vane 3 is not located within the annular cavity 20 formed between the internal wall 21 and the external wall 22.

Figure 10A:
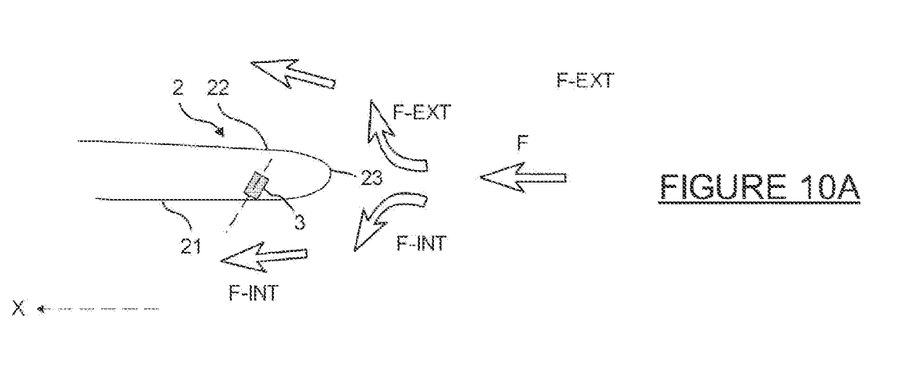
Figure 10B:
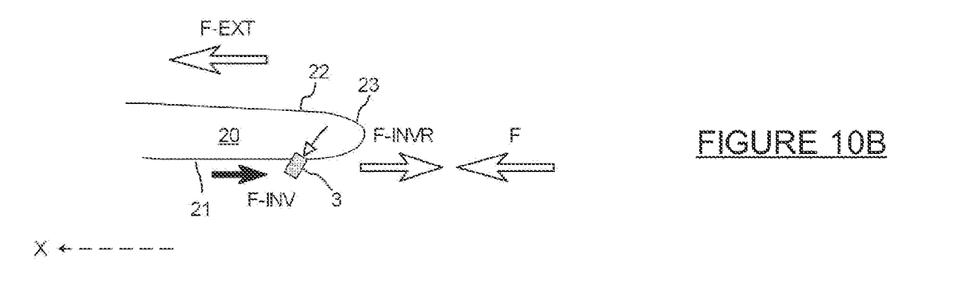
Figure 10C:
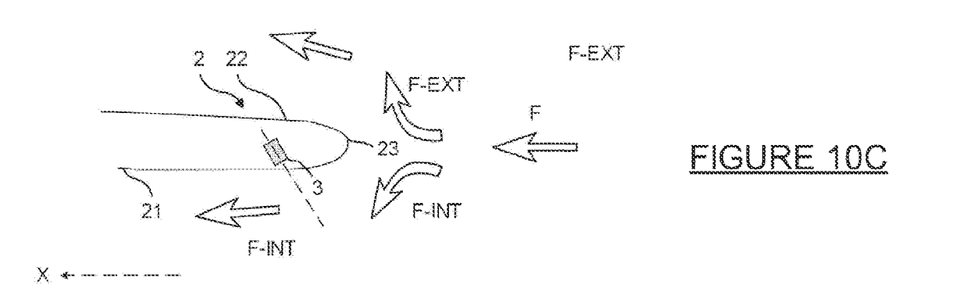
Figure 10D:
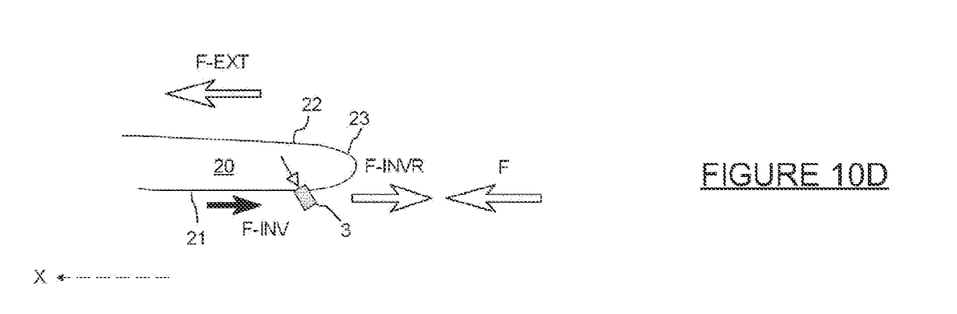
FIG. 10D are schematic representations of extension kinematics of a translating guide vane along an extension axis tilted with respect to the radial direction.

A guide vane 3 that is translationally extended along a substantially radial direction has been represented in FIGS. 7A-7C. Of course, extension along a translational axis tilted downstream (FIGS. 10A-10B) or upstream (FIGS. 10A-10B) can also be contemplated.

According to one aspect of the invention, extension of a guide vane 3 may be achieved by a moving member that is passive.

Figure 11A:
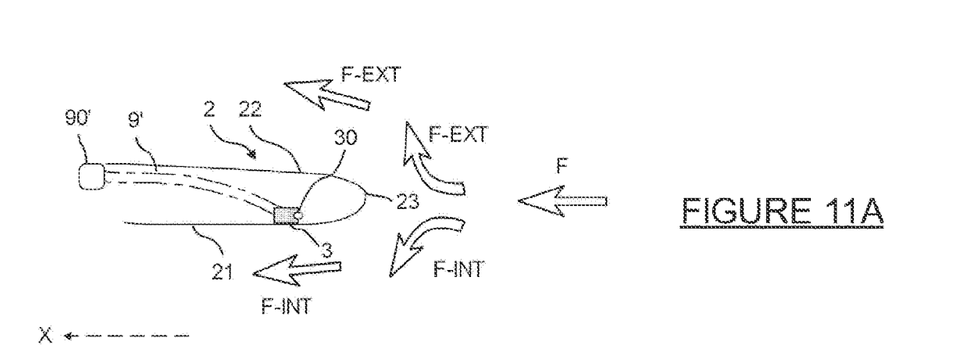
Figure 11B:
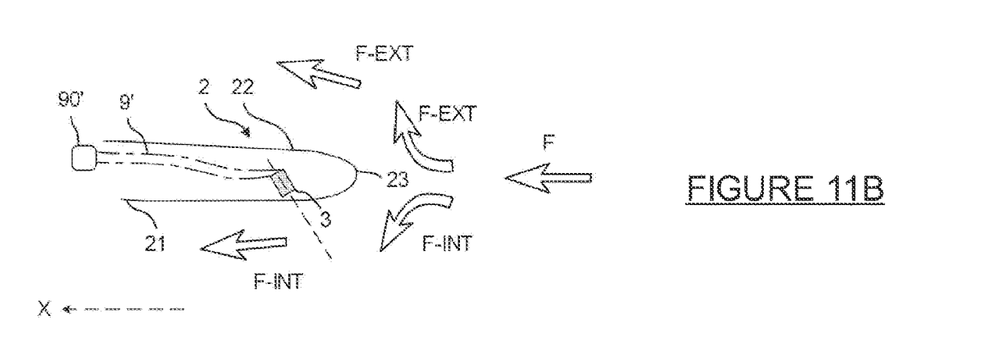
FIG. 11B are schematic representations of an air intake comprising a passive moving device.

With reference to FIGS. 11A-11B, a passive moving member is represented in the form of a pneumatic conduit 9' formed in the annular cavity 20 and opening onto the guide vane 3 in order to move it by suction or blowing between the retracted position and the extended position.

Preferably, the pneumatic conduit 9' is connected to an overpressure source 90' which, due to the pressure difference between the air stream and the pneumatic conduit 9', allows the guide vane 3 to be moved by suction. The pressure in the air stream is lower due to the acceleration of the reverse air flow F-INV by the fan 11. In this example, the suction extension can be partial, as the aerodynamic forces in the air stream allow a full extension. A passive moving member is suitable for both translational and rotational kinematics.

According to one aspect of the invention, the pneumatic conduit 9' is fed by the reverse air flow. Preferably, during a thrust phase, the reverse air flow is no longer present, which automatically moves the guide vane 3 into the retracted position A.

A method for operating the air intake 2 according to the invention previously set forth is described below. For the sake of clarity, the movement of a single guide vane 3 is set forth, but it goes without saying that several guide vanes 3 may be moved concomitantly or sequentially.

During thrust, the fan 11 accelerates an internal air flow F-INT from upstream to downstream which is guided by the air intake 2 having an aerodynamic profile that promotes thrust. The guide vanes 3 are in the retracted position A during the thrust of the turbojet engine 1, so that the air intake 2 has an aerodynamic profile in order to guide the air flow. The use of a cover member 4 ensures an optimal aerodynamic profile during thrust.

During a thrust reversal phase of said turbojet engine 1, in particular following a change in the pitch of the fan vanes 11, the moving member(s) 9 move the guide vanes 3 into an extended position B, in which the guide vanes 3 projectingly extend from the internal wall 21 in a radially inward direction in order to guide the reverse air flow F-INV from the internal wall 21 to promote the thrust reversal phase.

Advantageously, such an operating method provides the aircraft with good performance both in thrust, where the internal air flow F-I NT is kept unchanged, and in reverse thrust, where the guide vanes 230 allow the reverse air flow F-INV to be untwisted. With reference to FIG. 8, the guided reverse air flow F-INVR circulates along the same direction but with an opposite sense to the upstream air flow F, thereby providing an effective reverse thrust phase.

According to one aspect of the invention, only part of the guide vanes 3 is moved during the movement step to adapt to different operating conditions, for example, during braking.

By virtue of the invention, the performance of the turbojet engine 1 is significantly improved during the thrust reversal phase while maintaining the existing performance during the thrust phase.

The invention claimed is:

1. A method for operating an aircraft turbojet engine, the aircraft turbojet engine extending along an axis X oriented from upstream to downstream in which an internal air flow circulates from upstream to downstream during a thrust phase and a reverse air flow from downstream to upstream during a thrust reversal phase, said turbojet engine comprising a variable pitch fan, comprising a plurality of fan vanes, configured to perform a thrust reversal, and a nacelle comprising an air intake extending circumferentially about the axis X, and comprising an internal wall facing the axis X and configured to guide the internal air flow and the reverse air flow, and an external wall opposite to the internal wall and configured to guide an external air flow, the internal wall and the external wall being connected to each other by an air intake lip so as to form an annular cavity, the air intake comprising a plurality of guide vanes positioned upstream of the variable pitch fan, each guide vane being movably mounted between (1) a retracted position to promote the thrust phase, and (2) an extended position in which the guide vane projectingly extends from the internal wall in a radially internal direction towards axis X in order to guide the reverse air flow from the internal wall to promote a thrust reversal phase, and in which the guide vane comprises a thick leading edge positioned downstream and a thin trailing edge, relative to the thick leading edge, positioned upstream;
the method comprising, during the thrust reversal phase of said turbojet engine, changing a pitch of the variable pitch fan and moving the plurality of guide vanes from the retracted position to the extended position.

2. The method according to claim 1, wherein the plurality of guide vanes of the air intake of the turbojet engine are distributed circumferentially about axis X.

3. The method according to claim 1, wherein the air intake of the turbojet engine comprises at least one moving member configured to move one of the plurality of guide vanes from the retracted position to the extended position.

4. The method according to claim 1, wherein at least one of the plurality of guide vanes of the air intake of the turbojet engine is translationally and/or rotationally mounted in the air intake.

5. The method according to claim 1, wherein at least one of the guide vanes of the air intake of the turbojet engine comprises an aerodynamic profile.

6. The method according to claim 1, wherein the air intake of the turbojet engine comprises a cover member movably mounted between an operating position, in which said cover member covers one of the plurality of guide vanes in the retracted position so as to ensure an aerodynamic profile during thrust, and a storage position, in which said cover member is offset from its operating position so that the one of the plurality of guide vanes is in the extended position.

7. The method according to claim 1, wherein the plurality of guide vanes of the air intake of the turbojet engine extend into the annular cavity of the air intake in the retracted position.

8. The method according to claim 1, wherein, a length of at least one of the plurality of guide vanes is less than ⅓ of a length of one of the fan vanes.

* * * * *